Dec. 13, 1932.   C. PAULSEN   1,890,656
THREE-WHEELED WAGON OR COASTER
Filed Feb. 18, 1931
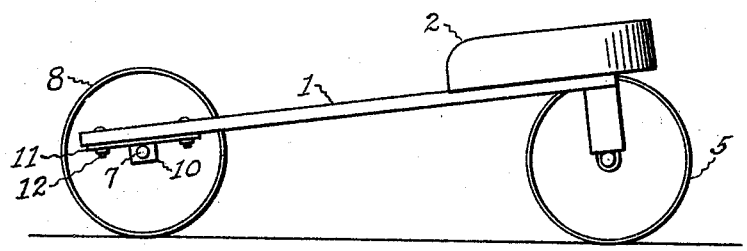
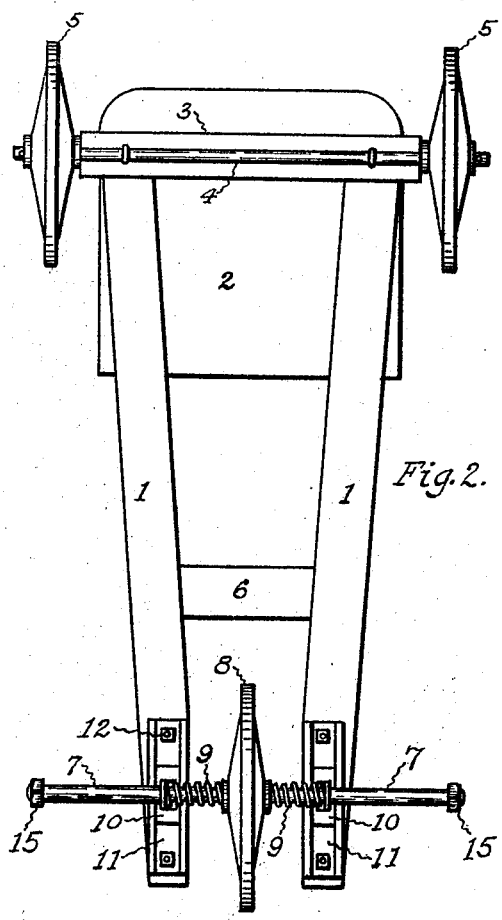
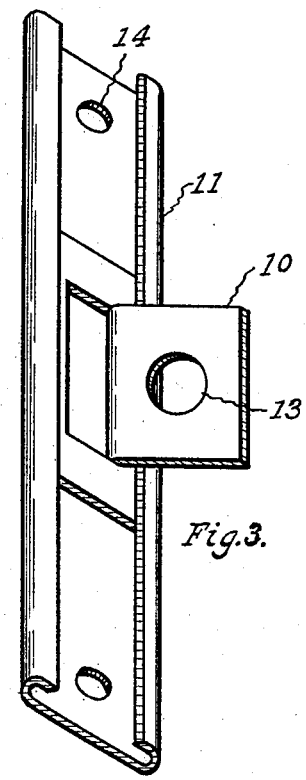

Patented Dec. 13, 1932

1,890,656

UNITED STATES PATENT OFFICE

CARL PAULSEN, OF ST. LOUIS, MISSOURI

THREE WHEELED WAGON OR COASTER

Application filed February 18, 1931. Serial No. 516,706.

My invention relates to coasting vehicles and has for its principal object, to provide a device of this character comprising one front wheel and two rear wheels. The one front wheel arrangement is such that steering of the vehicle may be effected while the user coasts upon or propels the vehicle. In accomplishing this object, I have provided improved details of structure, the preferred form of which is illustrated in the accompanying drawing wherein:—

Figure 1 is a side view of a vehicle constructed according to the present invention.

Figure 2 is an inverted plan view illustrating the mounting of the steering wheel.

Figure 3 is a detail perspective view of the sliding part that forms the part used in the steering apparatus.

Referring more in detail to the drawing.

Figure 1 shows the side view showing the arrangement of wheels, and members, axle and the other parts that make up the construction of said vehicle.

Figure 2 designates the underside of the body. The vehicle, embodying the present invention in its preferred construction, comprises side rails 1—1' secured together at their rearward ends by a crossbar 3 attached to the undersides of the rails and at the rearward end by a seat board 2, on the upper sides thereof. The parts are secured together by nail or bolts to form a substantial and rigid structure. The seat 2 is provided with sides. The seat is stamped of metal which forms a whole part, bottom and sides. The body is supported at the rear end by the ground wheels 5—5' which are mounted at opposite sides thereof. The axle 4 is fixed transversely across the frame to the underside of plate 3.

The rails 1—1' converge toward their forward ends and are held rigidly in spaced relation by cross bar 6, which is fastened to side rails 1—1'. Cross bar 6 is far enough from wheel 8 so it will not interfere with its movement and steering.

Figure 2, the steering apparatus is comprised of two channel plates 11—11' attached to the underside of side rails 1—1' with bolts 12—12'. The winged plates 10—10' slide backward or forward on channel plates 11—11'. The bolts 12—12' have nuts on the ends which act as stops to keep the winged plates 10—10' from sliding out of channel plates 11—11'. The sliding winged plate 10 as illustrated in Figure 3, has a hole through which the axle 7 passes. Channel plate 11 has two holes 14 through which bolts pass, the bolts holding the channel plate on to side rail 1 in Figure 2.

Figure 2 shows a wheel 8 midway between rails 1—1'. Springs 9—9' are used to keep the wheel 8 midway between rails 1—1' and the sliding plates 10—10'. These springs fit around the axle 7. Nuts 15—15' are on the ends of forward axle 7. Assuming that the vehicle is so constructed, a person may sit on the seat 2, place his feet on the foot-rests 7—7' and guide the device by turning the foot-rests backward or forward to any angle desired.

It is also apparent that if the user when not coasting, wishes to propel the vehicle manually, he may easily do so by the use of a short push rod, which he may extend through the opening between the side rails of the body, and into contact with the ground surface, so that by a rearward pressure on the push rod the vehicle will be urged forward.

It is apparent that a device of this character may be used for coasting or may be propelled manually by the user and the steering thereof may be easily effected by the movement of the foot-rests. The sliding wing plates act with foot-rests or axle and are held in place by channel plates which allow the sliding plates to move forward or backward. Cross bar 6 is used to make the forward portion of vehicle rigid.

Having described my invention that which I claim as new therein and desire to secure by Letters Patent is:—

In a vehicle of the character described, comprising a body having side sills supported upon front and rear running gears, said front running gear consisting of channel plates secured to the under side of each side sill, guide plates longitudinally slidable in each channel, downwardly projecting wing portions carried by each guide plate, an aperture in each wing, a wheel carrying axle extending through each aperture and beyond the sides of the sills to afford foot-rests for the occupant of the vehicle and springs on the axle between the wheel and each wing portion of the guide plate whereby the wheel is maintained centrally of the side sills and at the same time is free to be turned by the occupant to steer the vehicle.

In testimony thereof I affix my signature.

CARL PAULSEN.